(12) United States Patent
Kim

(10) Patent No.: US 9,751,132 B2
(45) Date of Patent: Sep. 5, 2017

(54) DRILLING WORKTABLE FOR MANUFACTURING TUBE SUPPORT PLATES AND METHOD OF MANUFACTURING TUBE SUPPORT PLATES USING THE SAME

(71) Applicant: DOOSAN HEAVY INDUSTRIES & CONSTRUCTION CO., LTD., Changwon-si (KR)

(72) Inventor: Kwang Won Kim, Yeongcheon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 146 days.

(21) Appl. No.: 14/596,395

(22) Filed: Jan. 14, 2015

(65) Prior Publication Data

US 2015/0196960 A1  Jul. 16, 2015

(30) Foreign Application Priority Data

Jan. 16, 2014  (KR) .................. 10-2014-0005588

(51) Int. Cl.
*B23B 41/10* (2006.01)
*B23B 47/28* (2006.01)
*B23B 41/00* (2006.01)

(52) U.S. Cl.
CPC .......... *B23B 47/287* (2013.01); *B23B 41/00* (2013.01); *B23B 41/10* (2013.01); *B23B 2215/00* (2013.01);
(Continued)

(58) Field of Classification Search
CPC ... B23B 41/10; B23B 47/287; B23B 2250/12; Y10T 408/561
See application file for complete search history.

(56) References Cited

U.S. PATENT DOCUMENTS 264,263 A * 9/1882 Dubrul ................. B25H 1/0057
   408/235
410,803 A * 9/1889 McDaniel ............... B23B 39/12
   408/128
(Continued)

FOREIGN PATENT DOCUMENTS

CN  201848718 U  6/2011
DE  29632071 A1 * 2/1998
(Continued)

OTHER PUBLICATIONS

First Office Action issued Aug. 22, 2016 in counterpart Chinese Patent Application No. 201510024011.8.

*Primary Examiner* — Daniel Howell
(74) *Attorney, Agent, or Firm* — Sughrue Mion, PLLC

(57) ABSTRACT

The present disclosure relates to a drilling worktable for manufacturing tube support plates of a steam generator constituting a primary system of a nuclear power plant. The drilling worktable includes a plate having a drill insertion groove formed to face a position at which a heat transfer tube insertion hole is drilled in a member to be processed. In addition, the present disclosure relates to a method of manufacturing tube support plates using the drilling worktable for manufacturing tube support plates. The method includes fixing the member to be processed after locating the member to be processed on the upper surface of the seating section, and drilling the heat transfer tube insertion hole in the member to be processed using a drill unit.

15 Claims, 8 Drawing Sheets

(52) U.S. Cl.
CPC ....... *B23B 2247/00* (2013.01); *B23B 2250/12* (2013.01); *B23B 2260/072* (2013.01); *Y10T 408/03* (2015.01); *Y10T 408/44* (2015.01); *Y10T 408/561* (2015.01)

(56) References Cited

U.S. PATENT DOCUMENTS

| | | | | | |
|---|---|---|---|---|---|
| 1,316,236 | A | * | 9/1919 | Hoffman | B23Q 11/10 29/DIG. 68 |
| 2,272,271 | A | * | 2/1942 | Mallory | B23Q 11/005 29/DIG. 101 |
| 2,295,856 | A | * | 9/1942 | Mallory | B23D 77/00 408/82 |
| 2,360,921 | A | * | 10/1944 | Wiken | B23B 39/00 384/130 |
| 2,398,134 | A | * | 4/1946 | De Anguera | B23Q 5/225 408/100 |
| 2,676,413 | A | * | 4/1954 | Wharton | B23Q 1/01 269/297 |
| 2,975,661 | A | * | 3/1961 | Coleman | B23B 35/005 408/10 |
| 3,238,624 | A | * | 3/1966 | McCabe | B23B 35/005 33/23.03 |
| 3,606,300 | A | * | 9/1971 | Davis | B23Q 3/10 269/296 |
| 3,837,757 | A | * | 9/1974 | Levine | B23Q 5/10 408/135 |
| 3,861,275 | A | * | 1/1975 | Mueller | B23Q 3/18 409/121 |
| 4,429,862 | A | * | 2/1984 | Niedecker | B23Q 1/545 269/258 |
| 5,611,650 | A | * | 3/1997 | Perkins | B23Q 1/0063 248/346.03 |
| 6,494,649 | B2 | * | 12/2002 | Queipo | B23Q 1/032 408/108 |
| 2013/0209185 | A1 | * | 8/2013 | Sasaki | B23B 39/24 408/1 R |

FOREIGN PATENT DOCUMENTS

| | | | | |
|---|---|---|---|---|
| EP | 2620825 | A1 | | 7/2013 |
| GB | 391723 | A | | 5/1933 |
| JP | 55125910 | A | * | 9/1980 |
| JP | 05116013 | A | * | 5/1993 |
| NZ | WO 2010098680 | A1 | * | 9/2010 ............. B23B 39/00 |

* cited by examiner

DRILLING WORKTABLE FOR MANUFACTURING TUBE SUPPORT PLATES AND METHOD OF MANUFACTURING TUBE SUPPORT PLATES USING THE SAME

CROSS-REFERENCE(S) TO RELATED APPLICATIONS

This application claims priority to Korean Patent Application No(s). 10-2014-0005588, filed on Jan. 16, 2014, the disclosure(s) of which is(are) incorporated herein by reference in its(their) entirety.

BACKGROUND OF THE INVENTION

Field of the Invention

Exemplary embodiments of the present invention relate to a drilling worktable for manufacturing tube support plates and a method of manufacturing tube support plates using the same, and more particularly, to a drilling worktable for manufacturing tube support plates of a steam generator, which constitutes a primary system of a nuclear power plant, by drilling members to be processed, and a method of manufacturing tube support plates using the same.

Description of the Related Art

A nuclear power plant is largely divided into a primary system and a secondary system. The primary system includes steam generation-related devices and an SG (Steam Generator) is a representative example thereof. Meanwhile, the secondary system includes electricity production-related devices and devices for restoring steam to water.

High-temperature primary coolant supplied from a reactor is introduced into an SG (Steam Generator) and exchanges heat with secondary coolant outside heat transfer tubes while flowing along the heat transfer tubes inside the steam generator. As a result, heat energy is transferred from the primary side to the secondary side.

The heat transfer tubes are fitted, in a bundle form, to a plurality of TSPS (Tube Support Plates) and heat transfer tube insertion holes formed on one TS (Tube Sheet), so as to be supported within the steam generator.

The TSPS (Tube Support Plates) are manufactured through a heat transfer tube insertion hole drilling step, a deburring step, a broaching step, a deburring step, a honing step, and an inspection step.

In this case, maintaining flatness of a member to be processed in the drilling step has a great influence on quality of the tube support plates which are finished products. This is particularly because the broaching step, which is a step subsequent to the drilling step, is a process sensitive to material flatness.

In this context, U.S. Patent Laid-Open Publication No. 2013-0259588 (Patent Document 1) is disclosed as the related art of a drilling worktable for manufacturing tube support plates used in the drilling step and a method of manufacturing tube support plates using the same. A conventional drilling support beam for manufacturing tube support plates is disclosed as another related art, and is shown in FIG. 10.

Referring to FIG. 10, conventional drilling support beams for manufacturing tube support plates 20 are located between a member to be processed 10 and a device worktable 30 and then used. The drilling support beams 20 each have a bar shape. The drilling support beams 20 are located at a lower surface of the member to be processed 10 to locally support a vertical load thereof.

In addition, the conventional drilling support beams for manufacturing tube support plates 20 do not uniformly support a whole load of the member to be processed 10 but locally support the load only at parts at which the drilling support beams 20 are located, when the drilling step is performed in a direction of the arrow X in FIG. 10. Accordingly, there is a problem in that the member to be processed 10 is entirely bent or twisted due to stress according to the drilling.

For this reason, there is a problem in that the member to be processed 10 is bent or twisted so that a heat transfer tube insertion hole is not drilled at an accurate position thereof or vertical straightness of the hole is lowered below a certain criteria. In addition, since flatness of the member to be processed 10 is further lowered in the broaching step which is a step subsequent to the drilling step, there is a problem in that a poor tube support plate which does not satisfy a certain criteria is produced to thereby cause unnecessary times and costs for manufacturing a new tube support plate again.

[Patent Document 1] U.S. Patent Laid-Open Publication No. 2013-0259588

SUMMARY OF THE INVENTION

An object of the present invention is to provide a drilling worktable for manufacturing tube support plates and a method of manufacturing tube support plates using the same, capable of allowing flatness of a member to be processed to be maintained above a certain criteria by supporting a load of the member to be processed through large surface contact in a drilling step.

Another object of the present invention is to provide a drilling worktable for manufacturing tube support plates and a method of manufacturing tube support plates using the same, capable of allowing a heat transfer tube insertion hole to be drilled at an accurate position of a member to be processed and allowing vertical straightness of the hole to be maintained above a certain criteria.

A further object of the present invention is to provide a drilling worktable for manufacturing tube support plates and a method of manufacturing tube support plates using the same, capable of improving process reliability in subsequent steps as well as a drilling step to thereby enable a tube support plate to be more perfectly manufactured.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a drilling worktable for manufacturing tube support plates of a steam generator constituting a primary system of a nuclear power plant, includes a plate having a drill insertion groove formed to face a position at which a heat transfer tube insertion hole is drilled in a member to be processed.

The plate may include a seating section formed on an upper surface thereof so as to protrude upward, and a groove section through which coolant supplied when a drill insertion groove is drilled downward of the seating is discharged.

The seating section and the groove section may have at least one drill insertion groove formed on upper surfaces thereof.

The seating section may have a flat upper surface.

The plate may include an edge section formed at a position spaced from the member to be processed in a circumferential and outward direction.

The drill insertion groove may include an opening portion opened at one side of an upper surface thereof for discharge of the coolant.

The plate may have at least one coolant discharge hole formed to guide drainage of the drilling coolant introduced into the groove section.

The plate may include a coolant merging hole communicating with a lower end of the coolant discharge hole, and the coolant may be merged into the coolant merging hole to be discharged out of the plate.

The coolant discharge hole may be tapered inward such that an inlet portion opened at an upper end of the coolant discharge hole guides the drilling coolant to the inside of the plate.

The plate may have at least one stay rod hole formed at the groove section such that a stay rod connected from the member to be processed for improving of flatness thereof is capable of passing through the stay rod hole.

The stay rod hole may have a thread formed on an inside surface thereof such that a clamping device is capable of being coupled to the stay rod hole.

The plate may be formed with a gauge installation groove for installing a dial gauge in a circumferential direction of the seating section.

The gauge installation groove may be configured such that a plurality of gauge installation grooves is radially formed.

In accordance with another aspect of the present invention, a method of manufacturing tube support plates of a steam generator constituting a primary system of a nuclear power plant using the drilling worktable for manufacturing tube support plates, includes fixing the member to be processed after locating the member to be processed on the upper surface of the seating section, and drilling the heat transfer tube insertion hole in the member to be processed using a drill unit.

In the fixing the member to be processed, the member to be processed may be fixed in such a manner that the stay rod connected from the member to be processed for improving of flatness thereof passes through the stay rod hole.

In the fixing the member to be processed, the member to be processed may be fixed by coupling the clamping device to the thread formed in the stay rod hole.

In the drilling the heat transfer tube insertion hole, a center of the drill insertion groove may coincide with a center of rotation of a drill bit of a drill unit.

In the drilling the heat transfer tube insertion hole, a drilling coordinate of the heat transfer tube insertion hole may be corrected by installing the dial gauge at the gauge installation groove and sensing a position change of the member to be processed.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
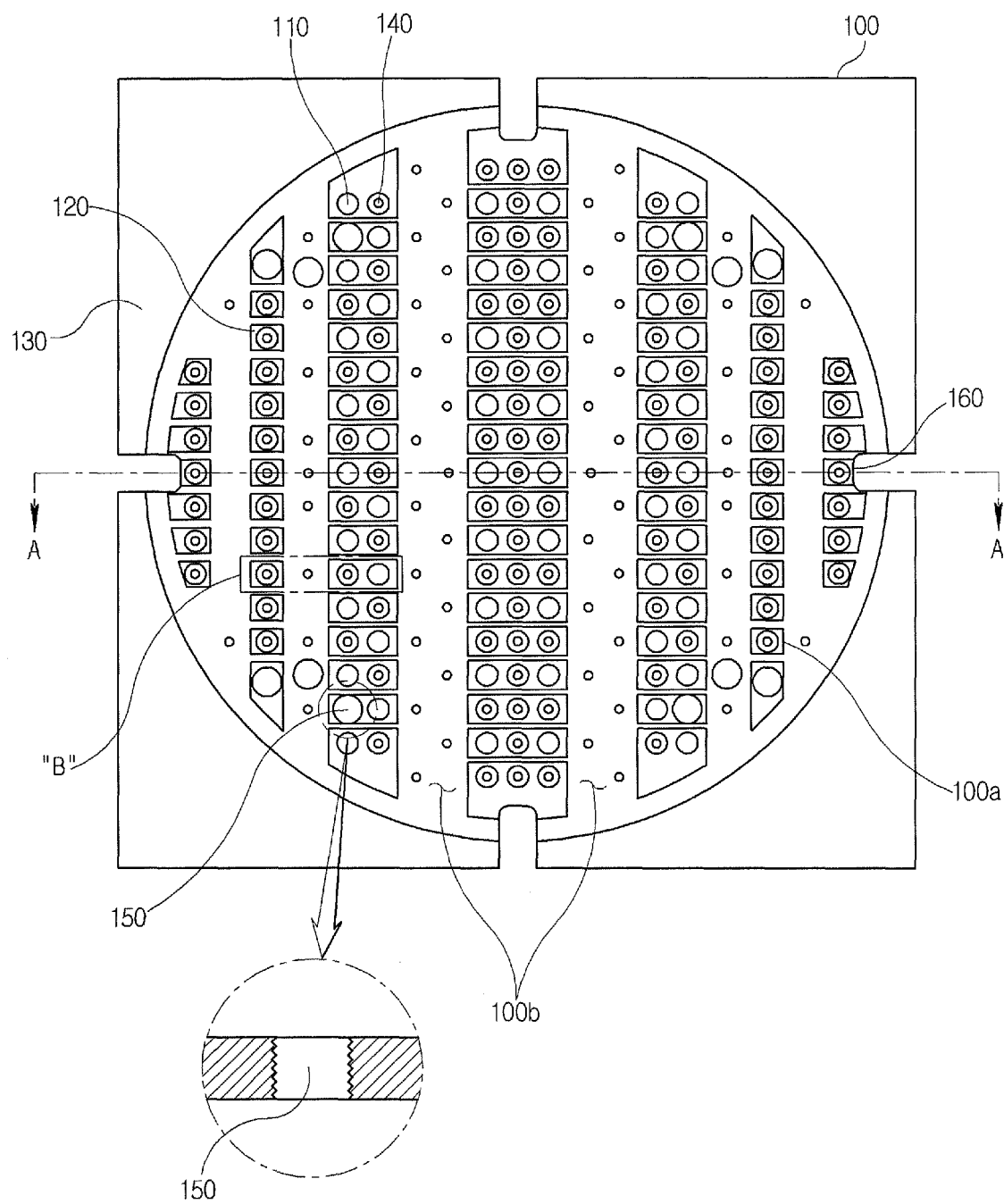
FIG. 1 is a top view schematically illustrating a drilling worktable for manufacturing tube support plates according to an embodiment of the present invention.
Figure 2:
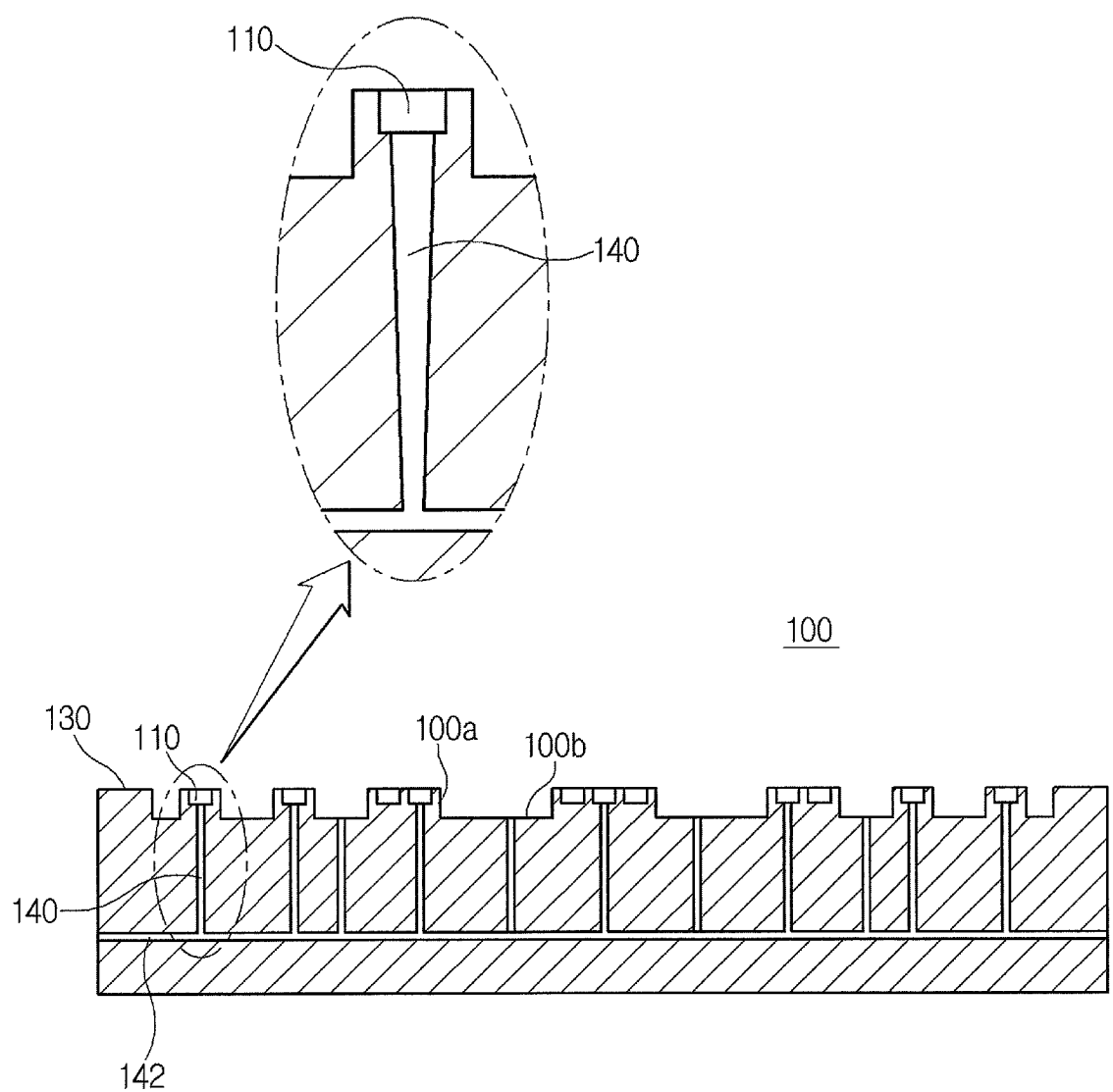
FIG. 2 is a cross-sectional view illustrating the drilling worktable for manufacturing tube support plates according to the embodiment of the present invention, taken along line A-A of FIG. 1.

A configuration of a drilling worktable for manufacturing tube support plates according to an exemplary embodiment of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments. For reference, FIG. 1 is a top view schematically illustrating a drilling worktable for manufacturing tube support plates according to an embodiment of the present invention. FIG. 2 is a cross-sectional view illustrating the drilling worktable for manufacturing tube support plates according to the embodiment of the present invention, taken along line A-A of FIG. 1.

Referring to FIGS. 1 and 2, the drilling worktable for manufacturing tube support plates according to the embodiment of the present invention is a drilling worktable for manufacturing tube support plates of a steam generator, which constitutes a primary system of a nuclear power plant, by drilling members to be processed. The drilling worktable includes a plate 100 formed with drill insertion grooves 110 in an uneven form such that the drill insertion grooves 110 face positions at which heat transfer tube insertion holes are drilled in a member to be processed in a state in which the member to be processed is placed on seating sections 100a.

The plate 100 has a rectangular parallelepiped shape so as to be easily moved to a work region or a specific place by a worker. The plate 100 includes seating sections 100a which are formed with a plurality of drill insertion grooves 110 and configured such that the member to be processed 10 directly comes into close contact with the seating sections 100a, and groove sections 100b formed at positions spaced downward from the seating sections 100a.

The seating sections 100a protrude upward of the plate 100 to be vertically stepped with the groove sections 100b to be described later. Since the seating sections 100a may serve as support plates when the drill insertion grooves 110 are drilled in a state in which the seating sections 100a are in horizontal contact with a lower surface of the member to be processed 10 having various diameters, the plurality of drill insertion grooves 110 may be drilled with accuracy and within an error range. Consequently, it may be possible to improve workability of the worker and uniformly maintain vertical straightness of the heat transfer tube insertion holes.

The seating sections 100a are configured such that the plurality of drill insertion grooves 110 is arranged in a specific direction on an upper surface of the plate 100. In the embodiment, the plurality of drill insertion grooves 110 is closely arranged at certain intervals in the vertical direction.

When the heat transfer tube insertion holes are drilled in the member to be processed using a drill unit (not shown), the drill insertion grooves 110 serve to guide drilling positions such that the heat transfer tube insertion holes are drilled at accurate positions. The drill insertion grooves 110 may be formed at various positions and in various numbers according to the design method of the steam generator, and are not especially limited to arrangement shown in the drawings.

Each of the drill insertion grooves 110 is opened to have a relatively greater diameter than each of the heat transfer tube insertion holes such that an inside surface or upper surface of the drill insertion groove is worn when the member to be processed is drilled by the drill unit.

The seating sections 100a are formed in a pattern parallel with line A-A in the drawings, but are not necessarily limited to such a specific pattern. This form is to merely explain the present invention. For example, the seating sections 100a may be formed in one selective pattern of a vertical pattern, a horizontal pattern, and a mixed pattern thereof.

In addition, the seating sections 100a may be formed in various shapes. However, each of the seating sections 100a is preferably formed to have a flat surface at a circumferential end thereof abutting the member to be processed in order to support a load of the member to be processed through maximum surface contact.

In the plate 100, drilling coolant for cooling when the heat transfer tube insertion hole is drilled by the drill unit is discharged through the groove sections 100b due to a height difference between each of the seating sections 100a and each of the groove sections 100b, and a detailed description thereof will be given later.

The plate 100 includes an edge section 130 formed at the outermost position of the seating section 100a, and the edge section 130 has a flat upper surface.

Since the groove section 100b is formed beneath the seating section 100a in the plate 100, a large amount of drilling coolant may be discharged through the groove section 100b. In addition, since the groove section 100b may extend toward the edge section 130 in one direction, a large amount of coolant according to the drilling is stably discharged.

In an alternative embodiment, the plate 100 includes an inclined section (not shown) inclined downward toward the edge section 130 such that drainage efficiency of the large amount of coolant discharged through the groove section 100b is improved. Thus, the large amount of coolant moved to the groove section 100b may be discharged without flowing backward to the seating section 100a and thus the drilling coolant may be naturally discharged.

Figure 3:
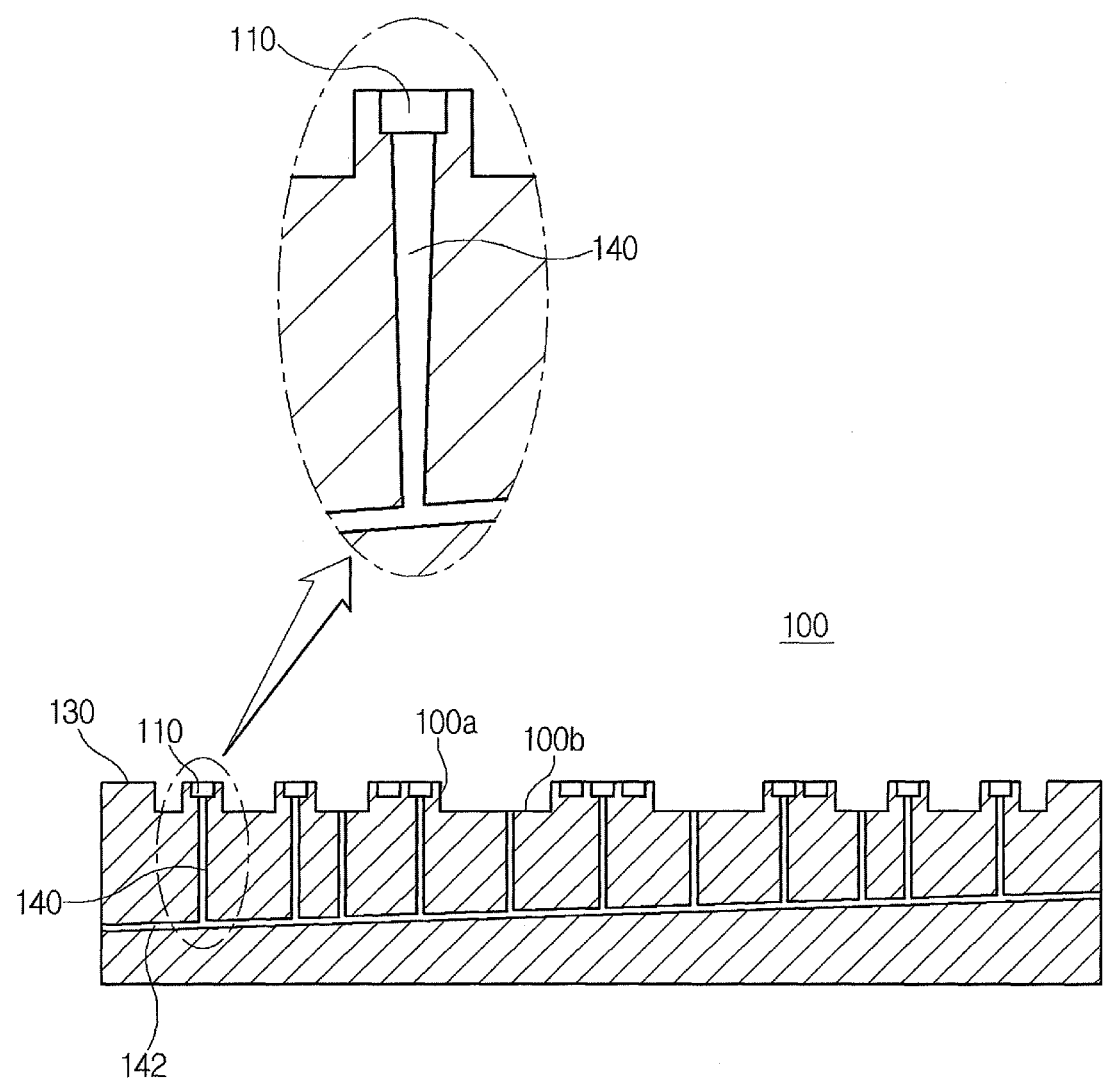
FIG. 3 is a cross-sectional view illustrating a drilling worktable for manufacturing tube support plates according to another embodiment of the present invention.

Referring to FIGS. 2 and 3, the plate 100 has at least one coolant discharge hole 140 formed to guide drainage of the drilling coolant. The coolant discharge holes 140 are respectively formed at the plurality of the seating sections 100a formed in the plate 100 and enable the coolant according to the drilling to be discharged.

The coolant discharge holes 140 extend downward in the inside of the plate 100. Since the plurality of coolant discharge holes 140 communicates with a coolant merging hole 142, the coolant introduced through the coolant discharge holes 140 may be discharged to one side of the plate 100 through the coolant merging hole 142.

That is, the drilling coolant is prevented from collecting in the drill insertion grooves 110 during drilling of the seating sections 100a, and thus the drilling coolant is smoothly discharged.

If the coolant discharge holes 140 are blocked due to a burr of the member to be processed or accumulation of the drilling coolant, the stagnant drilling coolant may be discharged by injection of compressed air into the coolant discharge holes 140.

Each of the coolant discharge hole 140 may be formed in a tapered shape such that an inlet portion formed at an upper portion thereof guides the drilling coolant to the inside of the plate 100. Consequently, drainage may be efficiently performed even when the amount of coolant is relatively increased.

The plurality of coolant discharge holes 140 may be formed in the inside of the plate 100. In this case, the coolant discharge holes 140 communicate with the coolant merging hole 142 and thus the large amount of coolant may be stably discharged.

At least one stay rod hole 150, through which a stay rod (not shown) connected from the member to be processed is capable of passing, is formed in the seating section 100a of the plate 100. Preferably, a plurality of stay rod holes 150 may be formed.

The stay rod is a rod which is pulled and fixed in the ground direction such that the member to be processed 10 is smoothed flat, prior to drilling of the member to be processed 10. The member to be processed 10 may be flat fixed for a long time by placing the member to be processed 10 on the seating sections 100a and then fixing the stay rod connected from the member to be processed 10 through the stay rod hole 150 to the ground or a separate fixture (not shown).

In addition, the stay rod hole 150 has a thread formed on an inside surface thereof such that a clamping device may be coupled to the stay rod hole. Consequently, the member to be processed may be more securely fixed through further clamping during drilling of the member to be processed.

Gauge installation grooves 160 for installing a dial gauge may be formed around the plate 100. Here, the dial gauge is referred to as a dial indicator. The dial gauge does not directly measure a length of a measure object, but compares the length. The dial gauge means a device for checking the uneven state of the plane, the attached state of the structure, the off-centered state of the axis, the non-rectangular state, etc. Particularly, the dial gauge is used to identify movement of the member to be processed in the present invention, as described later.

The plurality of gauge installation grooves 160 may be radially formed, and thus the entire flatness of the member to be processed may be efficiently measured.

Figure 4:
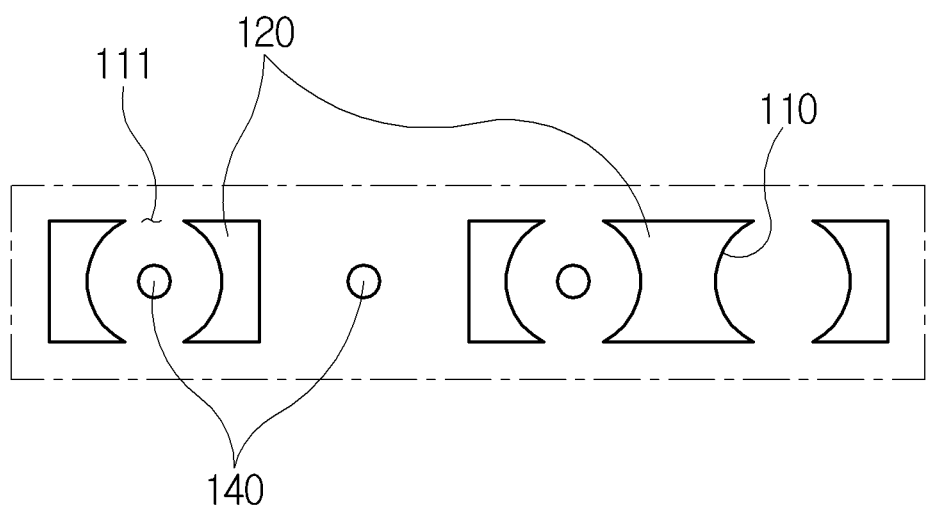
FIG. 4 is a partially enlarged view illustrating portion B of FIG. 1 according to another embodiment of the present invention.
Figure 5:
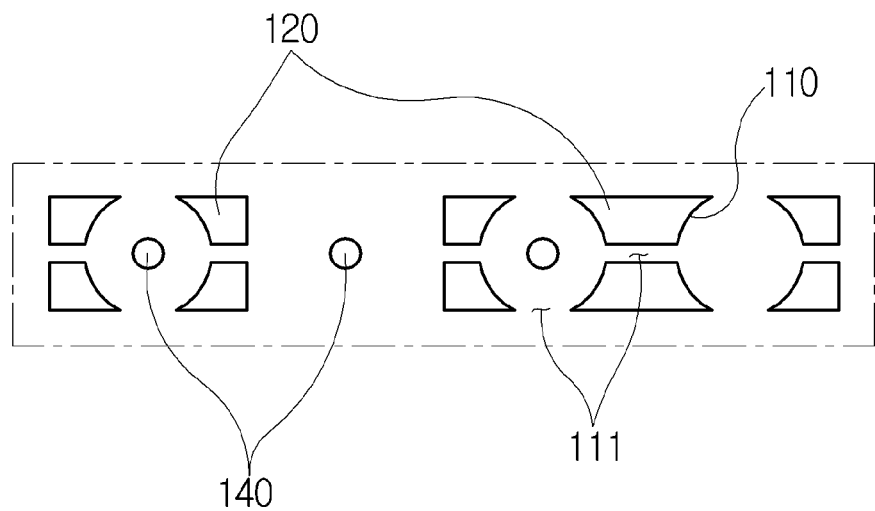
FIG. 5 is a partially enlarged view illustrating portion B of FIG. 1 according to a further embodiment of the present invention.

FIG. 4 is a partially enlarged view illustrating portion B of FIG. 1 according to another embodiment of the present invention. FIG. 5 is a partially enlarged view illustrating portion B of FIG. 1 according to a further embodiment of the present invention Referring to FIG. 4, each drill insertion groove 110 according to another embodiment of the present invention may be opened at one side thereof. That is, one side of the drill insertion groove 110 is formed with an opening portion 111 directed outward of an associated seating section 100a. Since drilling coolant may be simultaneously discharged through the drill insertion groove 110 and the opening portion 111 during the drilling, the drilling coolant may be efficiently discharged. That is, since the opening portion 111 of the drill insertion groove 110 may serve as a passage of the drilling coolant, a drainage effect may be increased even when an amount of coolant is relatively increased.

In this case, a drilling worktable for manufacturing tube support plates according to another embodiment of the present invention includes seating sections 100a, an edge section 130, drill insertion grooves 110, and opening portions 111. Each of the seating sections 100a has a relatively height difference to an associated groove section 100b and protrudes upward to have a certain height. Thus, the large amount of coolant may be discharged through the drill insertion grooves 110.

Referring to FIG. 5, each drill insertion grooves 110 has a plurality of opening portions 111 opened outward of an associated seating section 100a at front, rear, left, and right positions when viewed from the top.

In this case, unlike the opening portions 111 opened at the front and rear positions of the seating section 100a as shown in FIG. 3, the opening portions 111 are formed at the front, rear, left, and right positions in the embodiment. Therefore, the coolant may be simultaneously discharged through the coolant discharge holes 140 and the opening portions 111 even when an amount of coolant is relatively increased, and thus the drainage may be stably performed.

In addition, the plate 100 has inclined sections (not shown) formed at the groove sections 100b so that the drilling coolant is prevented from partially collecting in specific positions of the groove sections 100b, and thus the drainage may be smoothly performed.

Meanwhile, the seating section 100a may have the opening portions 111 having an opened form in the front, rear, left, and right directions, an opened form in the front and rear directions, or a mixed form thereof, but is not limited thereto.

Figure 6:
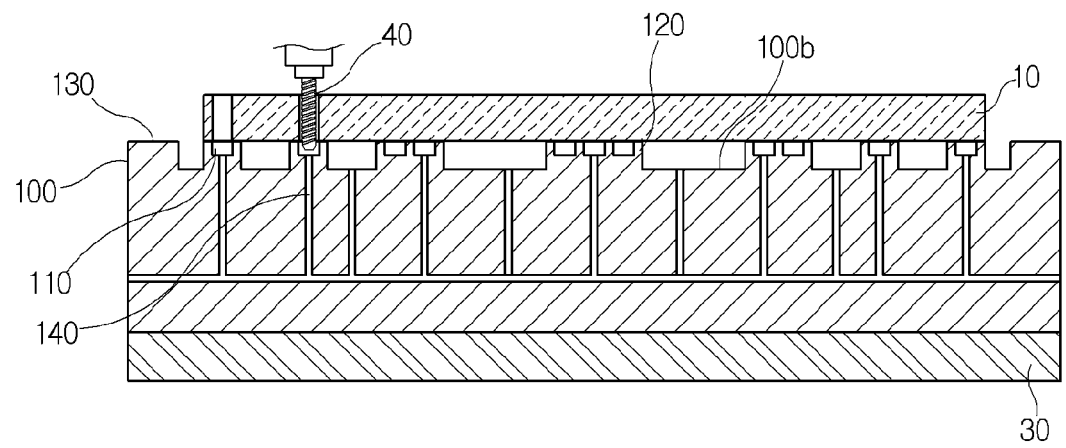
FIGS. 6 to 8 are cross-sectional views schematically illustrating a use state of the drilling worktable for manufacturing tube support plates according to an embodiment of the present invention.
Figure 7:
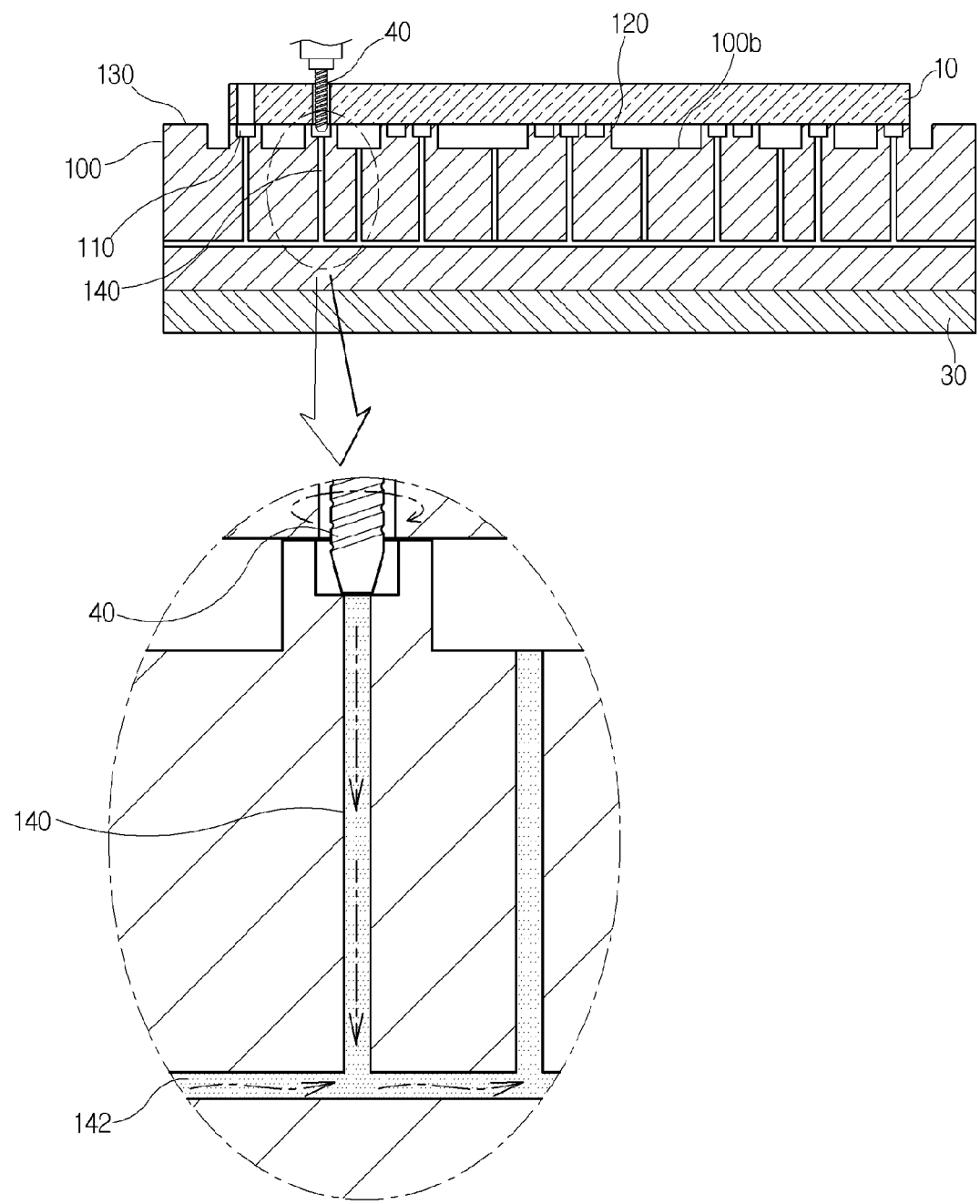
Figure 8:
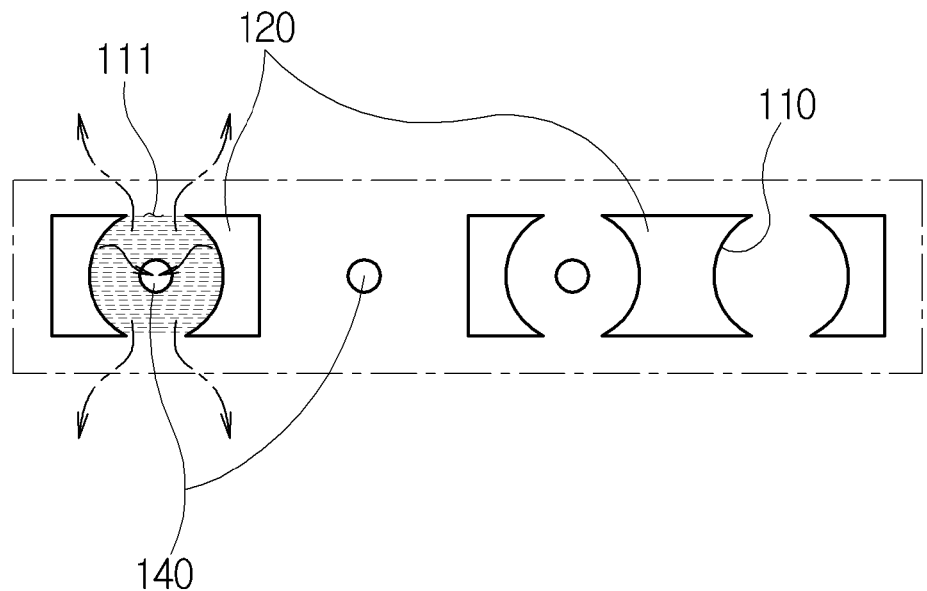

Referring to FIGS. 6 to 8, the drilling worktable for manufacturing tube support plates according to the embodiment of the present invention is located between the member to be processed 10 and a device worktable 30 and then used. In this case, the member to be processed 10 is maintained in a state of coming into close contact with the upper surfaces of the seating sections 100a of the plate 100.

When the heat transfer tube insertion holes are drilled in the member to be processed 10 using the drill unit, drill bits 40 may be stably inserted into the drill insertion grooves 110 toward the drilled positions thereof and thus the drilled positions of the plurality of drill insertion grooves 110 may be stably guided.

The coolant for cooling and drilling lubrication is supplied from the drill unit when the drill bits 40 rotate at high speed. In this case, the used drilling coolant is discharged through the groove sections 100b or coolant discharge holes 140 of the plate 100.

As described above, when the drilling coolant is partially collected or the coolant discharge holes 140 are blocked due to a burr of the member to be processed or accumulation of the drilling coolant, the drilling coolant may be discharged to the outside by the inclined sections without partial accumulation of the drilling coolant. In addition to the above method, the burr remaining in the drilling coolant may be removed by injection of air into the coolant discharge holes 140.

Figure 9:
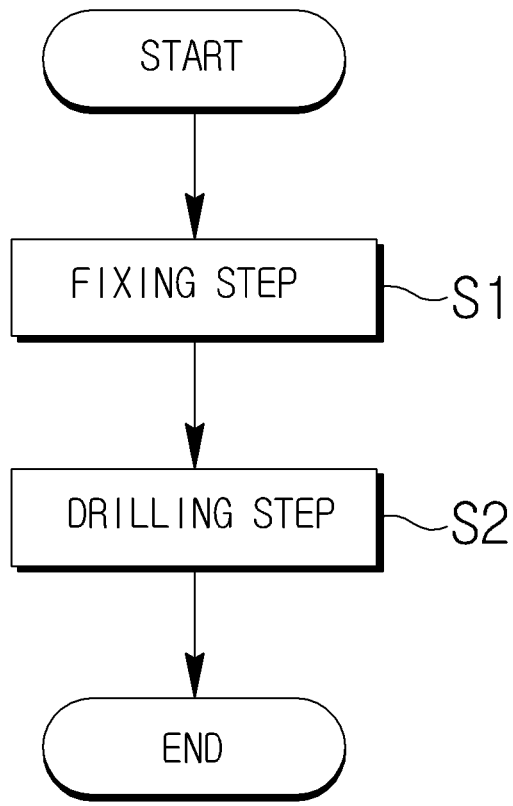
FIG. 9 is a flowchart illustrating a method of manufacturing tube support plates using the drilling worktable for manufacturing tube support plates according to an embodiment of the present invention.
Figure 10:
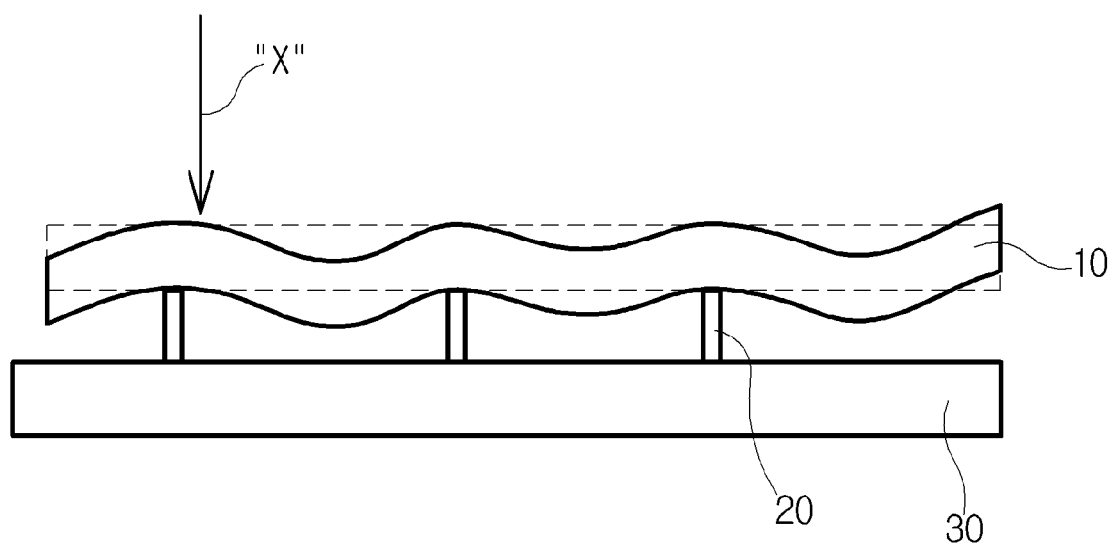
FIG. 10 is a view for explaining a conventional drilling support beam for manufacturing tube support plates.

FIG. 9 is a flowchart illustrating a method of manufacturing tube support plates using the drilling worktable for manufacturing tube support plates according to an embodiment of the present invention.

Referring to FIG. 9, the method of manufacturing tube support plates using the drilling worktable for manufacturing tube support plates according to the embodiment of the present invention includes a fixing step S1 and a drilling step S2.

The method of manufacturing tube support plates using the drilling worktable for manufacturing tube support plates according to the embodiment of the present invention is a method of manufacturing tube support plates of the steam generator constituting the primary system of the nuclear power plant using the drilling worktable for manufacturing tube support plates described with reference to FIGS. 1 to 8. The method includes the fixing step S1 of fixing the member to be processed 10 and the drilling step S2 of drilling the heat transfer tube insertion hole.

In the fixing step S1, the member to be processed 10 is located on the upper surface of the seating section 100a and then closely fixed to the upper surface. Particularly, instead of simply supporting and fixing the member to be processed 10 by the load thereof, the member to be processed 10 may be more stably fixed in such a manner that the stay rod connected to the member to be processed 10 passes through the stay rod hole 150 in order to maintain the flatness. For reference, in the fixing step S1, the member to be processed 10 may be securely fixed by coupling the clamping device to the thread formed in the stay rod hole 150.

In the drilling step S2, the heat transfer tube insertion hole is drilled in the member to be processed 10 using the drill unit. In this case, in order to drill the heat transfer tube insertion hole at the accurate position of the member to be processed 10 in the drilling step S2, the center of the drill insertion groove 110 preferably coincides with the center of rotation of the drill bit 40 of the drill device.

In addition, the drilling coordinate of the heat transfer tube insertion hole may be corrected by installing the dial gauge at the gauge installation groove 160 and sensing the position change of the member to be processed 10. That is, when the needle of the dial gauge moves, it is determined that the position change is present by the movement of the member to be processed 10. Then, the position of the pre-drilled heat transfer tube is grasped and then the drilling coordinate of the heat transfer tube is reset. Consequently, process reliability may be improved.

In accordance with the drilling worktable for manufacturing tube support plates and a method of manufacturing tube support plates using the same according to the present invention, the flatness of the member to be processed may be uniformly maintained by supporting the load of the member to be processed through large surface contact in the drilling step. The heat transfer tube insertion hole may be drilled at the accurate position of the member to be processed and thus vertical straightness of the hole may be maintained above a certain criteria. Meanwhile, it may be possible to improve reliability in the subsequent steps as well as the drilling step and to more perfectly manufacture the tube support plate.

In accordance with a drilling worktable for manufacturing tube support plates and a method of manufacturing tube support plates using the same according to exemplary embodiments of the present invention, flatness of a member to be processed may be uniformly maintained by supporting a load of the member to be processed through large surface contact in a drilling step, and thus it may be possible to achieve accurate processing and minimization of processing errors.

In accordance with exemplary embodiments of the present invention, a heat transfer tube insertion hole may be drilled at an accurate position of the member to be processed and thus vertical straightness of the hole may be maintained above a certain criteria.

In accordance with exemplary embodiments of the present invention, it may be possible to improve reliability in subsequent steps as well as the drilling step and to more perfectly manufacture a tube support plate.

While the present invention has been described with respect to the specific embodiments, it will be apparent to those skilled in the art that various changes and modifications may be made without departing from the spirit and scope of the invention as defined in the following claims.

What is claimed is:

1. A drilling worktable for manufacturing tube support plates of a steam generator constituting a primary system of a nuclear power plant, the drilling worktable comprising:
   a plate that supports a member to be processed, wherein the plate comprises:
   protruding seating sections formed on an upper surface of the plate so as to protrude upward and directly support the member to be processed; and
   a drill insertion groove formed as a recess into the upper surface of at least one of the protruding seating sections so as to face a position at which a heat transfer tube insertion hole is to be drilled in the member,
   groove sections disposed on an upper surface of the plate and between the protruding seating sections that are adjacent to each other, a lower surface of the groove section defined by the upper surface of the plate, wherein the groove sections are configured to allow coolant to flow through the groove sections when a drill unit drills the heat transfer tube insertion hole facing the at least one of the protruding seating sections while the coolant is discharged.

2. The drilling worktable according to claim 1, wherein the protruding seating sections have a flat upper surface.

3. The drilling worktable according to claim 1, wherein the plate further comprises an edge section formed at a position spaced from the member to be processed in a circumferential and outward direction.

4. A drilling worktable for manufacturing tube support plates of a steam generator constituting a primary system of a nuclear power plant, the drilling worktable comprising:
   a plate having a drill insertion groove formed to face a position at which a heat transfer tube insertion hole is to be drilled in a member to be processed;
   the plate further comprising:
   a seating section formed on an upper surface of the plate so as to protrude upward; and
   a groove section through which the coolant, supplied when a drill unit drills downward of the seating section, is discharged,
   wherein the drill insertion groove comprises an opening portion opened at one side of an upper surface of the drill insertion groove for discharge of the coolant.

5. The drilling worktable according to claim 1, wherein the plate further comprises at least one coolant discharge hole disposed under at least one of the groove sections and configured to guide drainage of the coolant from the at least one of the groove sections.

6. A drilling worktable for manufacturing tube support plates of a steam generator constituting a primary system of a nuclear power plant, the drilling worktable comprising:
   a plate having a drill insertion groove formed to face a position at which a heat transfer tube insertion hole is to be drilled in a member to be processed, wherein the plate further comprises:
   a seating section formed on an upper surface of the plate so as to protrude upward,
   a groove section through which coolant, supplied when a drill unit drills downward of the seating section, is discharged,
   at least one coolant discharge hole configured to guide drainage of the coolant introduced into the groove section, and
   a coolant merging hole communicating with a lower end of the coolant discharge hole, so that the coolant is merged from the coolant discharge hole into the coolant merging hole to be discharged out of the plate.

7. The drilling worktable according to claim 6, wherein the coolant discharge hole is tapered inward such that an inlet portion opened at an upper end of the coolant discharge hole guides the drilling coolant to the inside of the plate.

8. The drilling worktable according to claim 1, wherein the plate further comprises at least one stay rod hole formed at at least one of the groove sections and configured to allow a stay rod, connected from the member to be processed for improving of flatness thereof, to pass through the stay rod hole.

9. The drilling worktable according to claim 8, wherein the stay rod hole has a thread formed on an inside surface thereof configured to couple a clamping device to the stay rod hole.

10. The drilling worktable according to claim 1, wherein the plate includes a gauge installation groove for installing a dial gauge in a circumferential direction of the seating section.

11. The drilling worktable according to claim 10, wherein the gauge installation groove is a plurality of gauge installation grooves radially formed in the plate.

12. A method of manufacturing tube support plates of a steam generator constituting a primary system of a nuclear power plant using a drilling worktable for manufacturing tube support plates, wherein the drilling worktable includes a plate that supports a member to be processed, wherein the plate comprises:
   protruding seating sections formed on an upper surface of the plate so as to protrude upward and directly support the member to be processed; and
   a drill insertion groove formed as a recess into the upper surface of at least one of the protruding seating sections so as to face a position at which a heat transfer tube insertion hole is to be drilled in the member,
   groove sections disposed on an upper surface of the plate and between the protruding seating sections that are adjacent to each other, a lower surface of the groove section defined by the upper surface of the plate, the method comprising:

fixing the member to be processed on an upper surface of the protruding seating sections of the plate;

drilling the heat transfer tube insertion hole in the member to be processed using the drill unit, wherein the heat transfer tube insertion hole faces the drill insertion groove that is recessed into the upper surface of the protruding seating section; and supplying coolant during drilling, so that the coolant flows from the drill insertion groove into the groove sections.

13. The method according to claim 12, wherein the plate has at least one stay rod hole formed at at least one of the groove sections, wherein, in the fixing the member to be processed, the member to be processed is fixed in such a manner that a stay rod connected from the member to be processed passes through the stay rod hole.

14. The method according to claim 12, wherein the plate has at least one stay rod hole formed at at least one of the groove sections, wherein, in the fixing the member to be processed, the member to be processed is fixed by coupling a clamping device to a thread formed in the stay rod hole.

15. The method according to claim 12, wherein, in the drilling the heat transfer tube insertion hole, a center of the drill insertion groove coincides with a center of rotation of a drill bit of a drill unit.

* * * * *